US006565111B2

(12) United States Patent
Ageneau

(10) Patent No.: US 6,565,111 B2
(45) **Date of Patent: *May 20, 2003**

(54) FOLDING PUSHCHAIR WITH TILTING HANDLE EQUIPPED WITH A FOLDING CONTROL ON THE HANDLE

(75) Inventor: Laurent Ageneau, Cholat (FR)

(73) Assignee: AmparFrance, Cedex (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/405,317

(22) Filed: Sep. 23, 1999

(65) Prior Publication Data

US 2002/0084626 A1 Jul. 4, 2002

(30) Foreign Application Priority Data

Sep. 23, 1999 (FR) ........................................... 98 12059

(51) Int. Cl.[7] ................................................ B62B 7/08
(52) U.S. Cl. .................................. 280/647; 74/501.5 R
(58) Field of Search .......................... 280/64.7, 47.315, 280/47.371, 655, 655.1, 642; 74/502.3, 527, 501.5 R; 16/900, 239, 286, 405, 429, 430

(56) References Cited

U.S. PATENT DOCUMENTS

| | | | | |
|---|---|---|---|---|
| 4,660,850 A | | 4/1987 | Nakao et al. | |
| 4,880,015 A | | 11/1989 | Nierman | |
| 5,039,118 A | | 8/1991 | Huang | |
| 5,168,601 A | * | 12/1992 | Liu | 16/126 |
| 5,184,835 A | * | 2/1993 | Huang | 280/47.371 |
| 5,308,103 A | | 5/1994 | Chin-Shung | |
| 5,511,441 A | | 4/1996 | Arai | |
| 5,524,503 A | * | 6/1996 | Ishikura | 74/501.6 |
| 5,535,483 A | | 7/1996 | Jane Cabagnero | |
| 5,644,816 A | | 7/1997 | Chou | |
| 5,769,447 A | | 6/1998 | Huang | |
| 5,845,917 A | | 12/1998 | Huang | |
| 5,845,924 A | | 12/1998 | Huang | |
| 5,979,928 A | | 11/1999 | Kuo | |
| 6,068,284 A | * | 5/2000 | Kakuda | 280/642 |
| 6,102,432 A | | 8/2000 | Cheng | |
| 6,105,457 A | * | 8/2000 | Strasser | 74/501.5 R |
| 6,116,624 A | | 9/2000 | Hu | |
| 6,139,046 A | | 10/2000 | Aalund et al. | |

FOREIGN PATENT DOCUMENTS

| | | |
|---|---|---|
| FR | 2 693 162 | 1/1994 |
| FR | 2 607 770 | 6/1998 |
| WO | WO 98/47753 | 10/1998 |

* cited by examiner

*Primary Examiner*—Daniel G. DePumpo
*Assistant Examiner*—Tony Winner
(74) *Attorney, Agent, or Firm*—Merchant & Gould P.C.

(57) ABSTRACT

A folding pushchair of the type including a frame comprising in particular two front support arms, two rear support arms and a guide handle (16) mounted on two push arms (15) extending approximately along the line of the front support arms, and being free to move with respect to these support arms, between an unfolded position and a folded position, the handle (16) comprising unlocking means activating at least one unlocking cable (215). The handle (16) is hinged with respect to the push arms (15) through two hinge elements (110), the unlocking cable(s) (215) being guided through the hinge elements (110) such that the distance between the first means of attaching a first end of the cable to the unlocking means and the second means of attaching the second end of the cable to the frame unlocking means is constant for each of the unlocking cables, regardless of the inclination position of the handle.

11 Claims, 6 Drawing Sheets

FOLDING PUSHCHAIR WITH TILTING HANDLE EQUIPPED WITH A FOLDING CONTROL ON THE HANDLE

TECHNICAL FIELD

This invention relates to the child care domain. More precisely, the invention concerns pushchairs, and also more precisely folding pushchairs.

BACKGROUND

Very many different types of folding pushchairs are known. In general, manufacturers of this type of pushchair continuously attempt to improve various aspects, and particularly the safety of the child carried in the pushchair, the ease and efficiency of folding and unfolding, and more generally ease and ergonomy of using the pushchair.

Thus, to satisfy this latter objective, pushchairs were equipped with a handle with an adjustable position, that is adapted to the user's wishes and needs regardless of his height and habits.

Obviously, this type of handle which provides the user with additional comfort, must be easy to make and use and must be strong and safe and easy to handle. This function is usually performed by two hinges which connect the handle to the two push arms extending laterally on each side of the pushchair, usually approximately along the line of the front support arms.

Each of these hinges is composed of two main parts, fixed to the handle and one of the push arms respectively. These two parts are hinged with respect to each other by pivoting about a pin.

In normal mode (in other words when the handle is in the required position), the two parts are fixed to each other, for example through an engagement system. Therefore the position of the handle with respect to the push arms is fixed.

The adjustment may be made by temporarily separating the two parts which can then pivot with respect to each other, such that the position of the handle can be modified. For example, this separation may be achieved by pressing a release button, mobile along the pivot axis, such that this button temporarily disengages the engagement system.

Attempts are also made to simplify manipulations necessary to fold the pushchair, also with the intention of improving ergonomy and facilitating the user's task.

Conventionally, a double mechanism is provided on each side of the pushchair, at the position at which unlocking and folding actually take place (either using means for sliding the push arms along the front support arms or inside these support arms, or hinges in order to tilt the push arms along these front support arms).

This known technique has the disadvantage that it is not particularly easy to use. It requires a double manipulation since it is usually necessary to act on both sides of the pushchair simultaneously. Furthermore, this forces the user to bend down to unlock the pushchair and then to press on the push arms in some manner. Finally, due to their positions, these unlocking means may be accessible to a child sitting in the pushchair. Therefore additional safety devices are necessary to prevent the child from unlocking it accidentally.

A solution to these various problems has been proposed, which consists of transferring the unlocking control means onto the handle, in a location directly accessible to the user. In this case, this control acts on the unlocking means through cables passing inside the handle and push arms. Activating the control pulls on the cables that unlock unlocking means so that the pushchair can be folded. To obtain an efficient and easy guiding of the cables, it is necessary to avid acute angles.

Unfortunately, the two aspects according to prior art described above are clearly incompatible. The hinges used to adjust the position of the handle are solid elements equipped with a specific mechanism, mobile along an axis perpendicular to the direction along which the cable has to be routed. These hinges form a plug both at the end of the handles and at the end of the push arms. Consequently, it would be impossible to route a control cable along this path.

Furthermore, if an expert in the subject should envisage this possibility, he will immediately realize that there is a major risk that is not compatible with safety requirements. By modifying the position of the handle with respect to the push arm, it is obvious that there is a risk of loosening the cable which would then be unable to perform its unlocking function when the control is activated, or worse the cable could be stretched which could cause accidental unlocking and folding, even though the child may still be sitting in the pushchair.

SUMMARY OF THE INVENTION

The main objective of the invention is to overcome these various disadvantages in standard practice.

More precisely, one purpose of the invention is to provide a pushchair for a child with an optimized ergonomy to the user, both during normal operation (handle position) and during folding and unfolding operations (position of the control means for unlocking the folding means).

Another objective of the invention is to supply a pushchair of this type that is safe and reliable under all conditions.

Another objective of the invention is to provide a pushchair of this type that is simple and inexpensive to make and assemble. In particular, one purpose of the invention is to provide this type of pushchair that does introduce any significant extra cost compared with known pushchairs.

Another objective of the invention is to provide this type of pushchair that any user would find easy to use and manipulate.

Another objective of the invention is to provide a puschair of this type, in which the cables are easily and efficiently guided and easily to manipulate.

These objectives, and others that will be described later, are achieved using a folding pushchair of the type including a frame comprising in particular two front support arms, two rear support arms and a guide handle mounted on two connecting elements extending approximately along the line of the said front support arms and being free to move with respect to these support arms, between an unfolded position and a folded position, the said handle comprising unlocking means activating at least one unlocking cable moving in the said handle, and in at least one of the said connecting elements, and unlocking at least one frame locking element in order to enable a changeover from the said unfolded position to the said folded position.

According to the invention, the said handle is hinged with respect to the said connecting elements through two hinge elements, the said unlocking cable(s) being guided through the said hinge elements such that the distance between the first means of attaching a first end of the said cable to the said unlocking means and the second means of attaching the second end of the said cable to the said frame unlocking means is constant for each of the said unlocking cables, regardless of the inclination position of the said handle.

Thus, changing the inclination of the handle has no effect on the unlocking cables. Therefore, there is no risk that these unlocking cables may be loosened, or that unlocking may be activated accidentally when modifying the inclination of the handle.

According to one advantageous embodiment of the invention, each of the said locking cables intersects the pivot axis of the corresponding hinge element, regardless of the position of this element.

Note that this choice is not obvious, and a number of technical adaptations are necessary when making the connecting elements, as will be described later.

Preferably, each of the said locking cables is guided inside the connecting element towards the outside of the said pushchair.

In this way, the angles formed by the cables are larger and it is easier to make some parts of the hinge elements.

According to one particular embodiment of the invention, each of the said hinge elements comprises two parts fixed to the said handle and to one of the connecting elements respectively, and a control button installed along the said pivot axis and which can be in one of two end positions on the said pivot axis:

- a rest position, the default position, in which the said parts of the hinge element are fixed to each other; and
- an adjustment position, in which the said parts of the hinge element are free to move with respect to each other so that the inclination of the said handle can be modified, two openings being formed in the said control button, such that the said unlocking cable moves freely in the said pivot axis regardless of the position of the said control button.

According to another advantageous aspect of the invention, the said unlocking means comprise a central button acting on two symmetrical connecting rods, in order to pull the said unlocking cables when the said central button is pressed.

Preferably, the said connecting rods pivot about separate pins. In this way, an anti-unlocking safety device can easily be made.

Advantageously, each of the said connecting rods can be moved under the guidance of a pin fixed to the said connecting rod and passing through an opening or groove in a fixed position with respect to the said handle.

According to yet another advantageous aspect of the invention, the said locking means comprise at least one locking pin installed in the said connecting elements and cooperating with a corresponding notch formed in one of the said front support arms, the said pin being assembled such that it retracts inside the said connecting element when the corresponding unlocking cable is pulled, to enable the said connecting element to slide inside the said front support arm.

Preferably, the said pin is installed on a blade housed in a housing in a part that can slide inside the said connecting element, and one of the ends of which is fixed at the lower end of the said connecting element through return means, and the other end of which is fixed to the said unlocking cable, the said housing being shaped such that:

- in the rest position of the unlocking cable, the said pin tends to cooperate with the corresponding notch,
- when the unlocking cable is pulled, the blade carrying the said pin is guided towards the inside of the connecting element, entraining the said pin and thus enabling unlocking.

The said blade is advantageously folded back on itself and forms a return means which tends to bring the said pin into the locking position. Furthermore, according to an advantageous aspect of the invention in which the pin is guided more precisely, the said housing has two inclined guide planes cooperating with two corresponding contact surfaces defined on the said blade, on each side of the said pin.

BRIEF DESCRIPTION OF THE FIGURES

Other a characteristics and advantages of the invention will become more obvious after reading the following description of a preferred embodiment, given as a simple illustrative and non-restrictive example, and the attached drawings in which.

DETAILED DESCRIPTION

As described previously, the pushchair according to the invention has the following two characteristics:

- hinged handle, such that the position of the handle above the ground can be adjusted;
- unlocking of the folding means by cables, in order to enable control from the handle.

This result is obtained by keeping the length of the cable path constant regardless of the position of the handle. In particular, this can be achieved by routing this cable through the pivot axis of the hinge, as will become clearer later.

Figure 1:
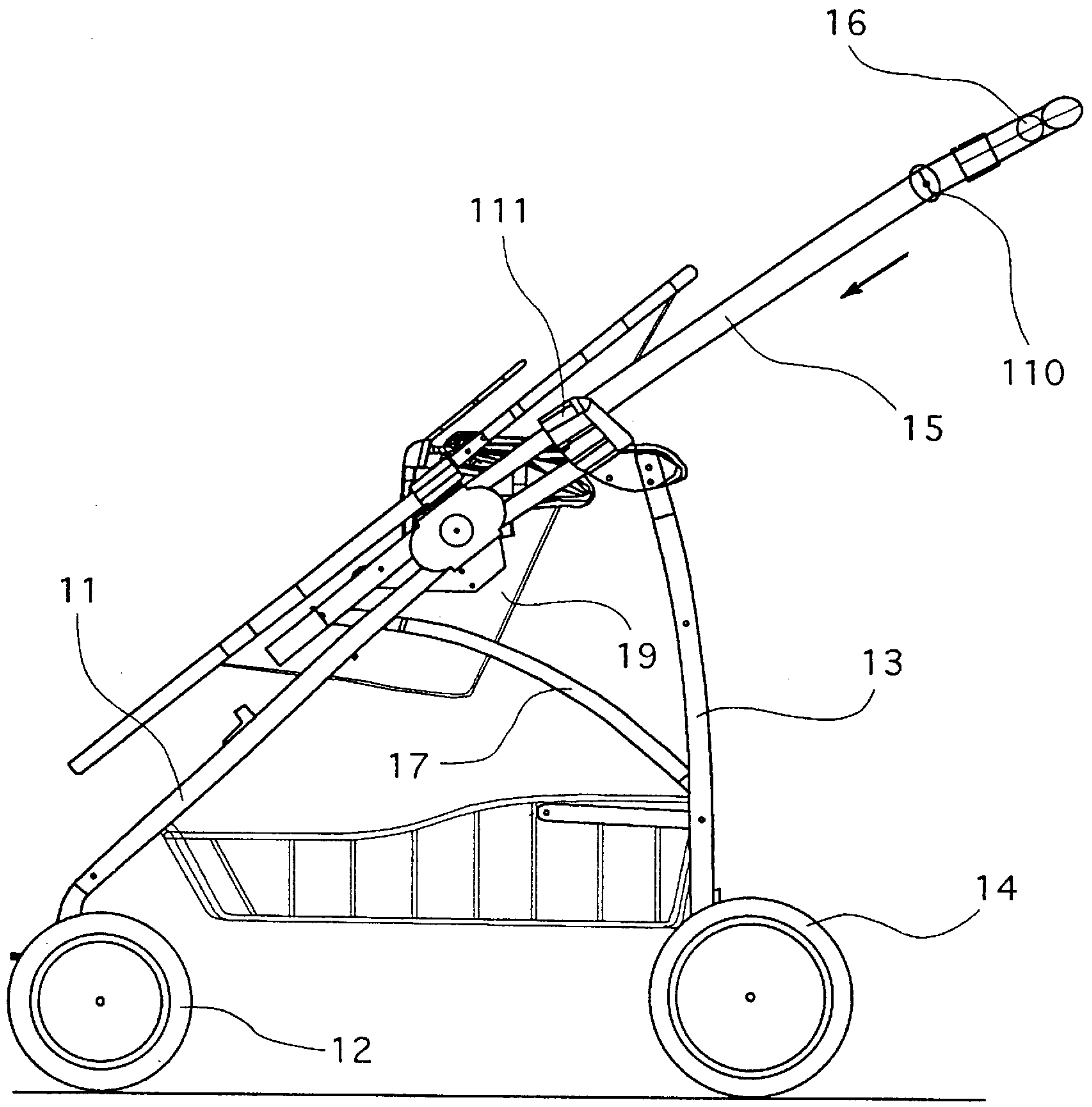
FIG. 1 diagrammatically illustrates a folding pushchair according to the invention.

FIG. 1 illustrates an embodiment of a pushchair according to the invention. This pushchair is seen from the side. It is obvious that the other side of the pushchair is completely symmetrical.

The pushchair comprises a frame formed particularly (on the side shown in the figure) of a front support arm (11) with one or several front wheels (12), a rear support arm (13) with one or several rear wheels (14) and a push arm (15) extended by a handle (16) that connects the two push arms together.

A cross piece (17) keeps the rear support arm (13) in its required position with respect to the front support arm (11). When the pushchair is folded the rear support arm (13) becomes parallel to the front support arm (11). Furthermore, also during folding, the push arm (15) slides along the front support arm (11), or possibly inside it. According to another embodiment, the push arm (15) may be folded and moved along the front support arm (11).

More generally, the invention can be used with any folding pushchair having folding control means mounted on the handle. Notably, the frame can be of the type disclosed in FR 2 607 770 (flat folding) or of the type disclosed in FR 2 693 162 (X—frame for compact folding in which the two sides of the pushchair are closed when it is folded).

This frame also comprises means of holding a hammock (19) that may advantageously be put in several positions with respect to this frame.

According to the invention, the handle (16) is hinged with respect to the push arm (15) using hinge means (110)

described more precisely later. A control button mounted on the handle (16) acts on the connecting element (111) to fold the pushchair as described more precisely later.

Figure 2A:
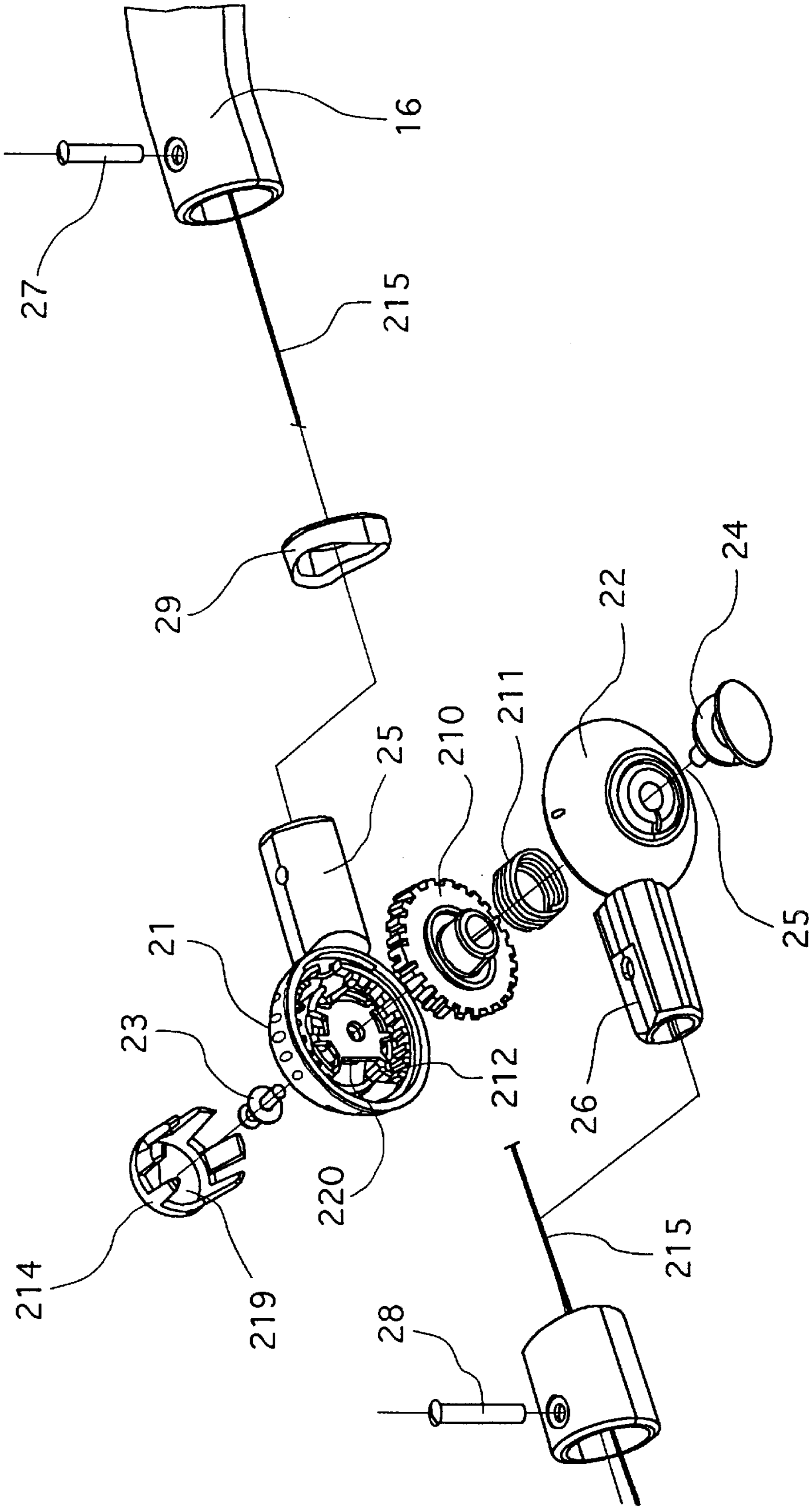
FIGS. 2A and 2B show exploded views of the two hinge elements of the handle of the pushchair in FIG. 1, according to the invention.
Figure 2B:
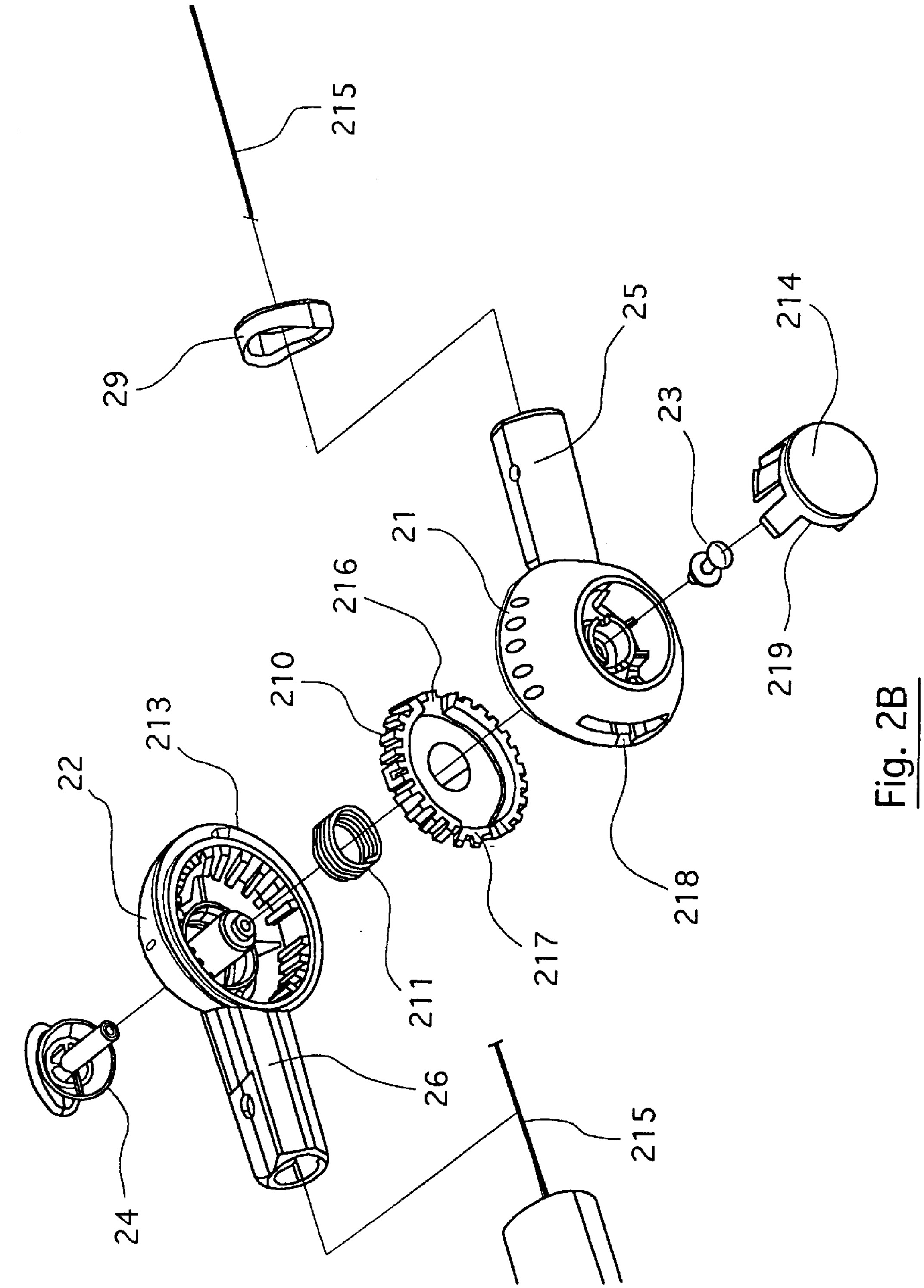

FIGS. 2A and 2B illustrate exploded views of hinge elements of the pushchair in FIG. 1 (right side and left side respectively as seen by the user pushing the pushchair). These two hinge elements are identical. The two figures show their shapes and structures entirely.

Therefore they comprise two half-shells (21 and 22) designed to be held in contact with each other by male (23) and female (24) attachment means. This may consist of a bolt or a rivet. These attachment means (23 and 24) define the pivot or hinge axis (225).

Each half-shell includes a projection (25, 26) designed to cooperate with the handle (16) and the push arm (15) respectively, in order to increase the rigidity of the assembly. For example, these projections may penetrate inside the push arm and the handle. They are then kept permanently in position using a rivet (27, 28) or a similar attachment system. An intermediate ring (29) that matches the shape of the half-shells (21, 22) may be provided, particularly for aesthetic or finish reasons, on one and/or the other of the projections.

There is a toothed wheel (210) held in the working position inside the two half-shells (21 and 22) by a spring (211), inside each hinge element. In this working position, the toothed wheel (210) cooperates with the corresponding means (212, 213) of engaging the two half-shells. Thus, the inclination position of the handle (16) is fixed.

This inclination may be modified using a button (214). This button is free to move along tie hinge axis (225) and when a force is applied to it, it disengages the toothed wheel (210) from the means (212) of engaging the half-shell (21). The two half-shells (21 and 22) are then free to move with respect to each other. The position of the handle (16) with respect to the push arm (15) can then be modified.

As soon as a force is no longer applied on button (214), the button returns to its initial position, and the toothed wheel (210) also moves to its initial position under the action of the spring (211).

According to the invention, the component parts of the hinges have been adapted to enable the control cable (215) to pass. Thus, this cable (215) intersects the hinge axis (225) regardless of the position of the handle. Therefore the distance between the two ends of the cable remains constant regardless of the position of the handle (16).

These adaptations particularly include the formation of adapted notches (216 and 217) in the toothed wheel, an opening (219) in the button (214), an opening (218) in the half-shell (21), and a passage (220) inside this half-shell, etc.

These various passages and openings are configured so that they do not hinder routing of the cable between the two extreme positions possible for the handle (16). They are also used to define these extreme positions.

Figure 3:
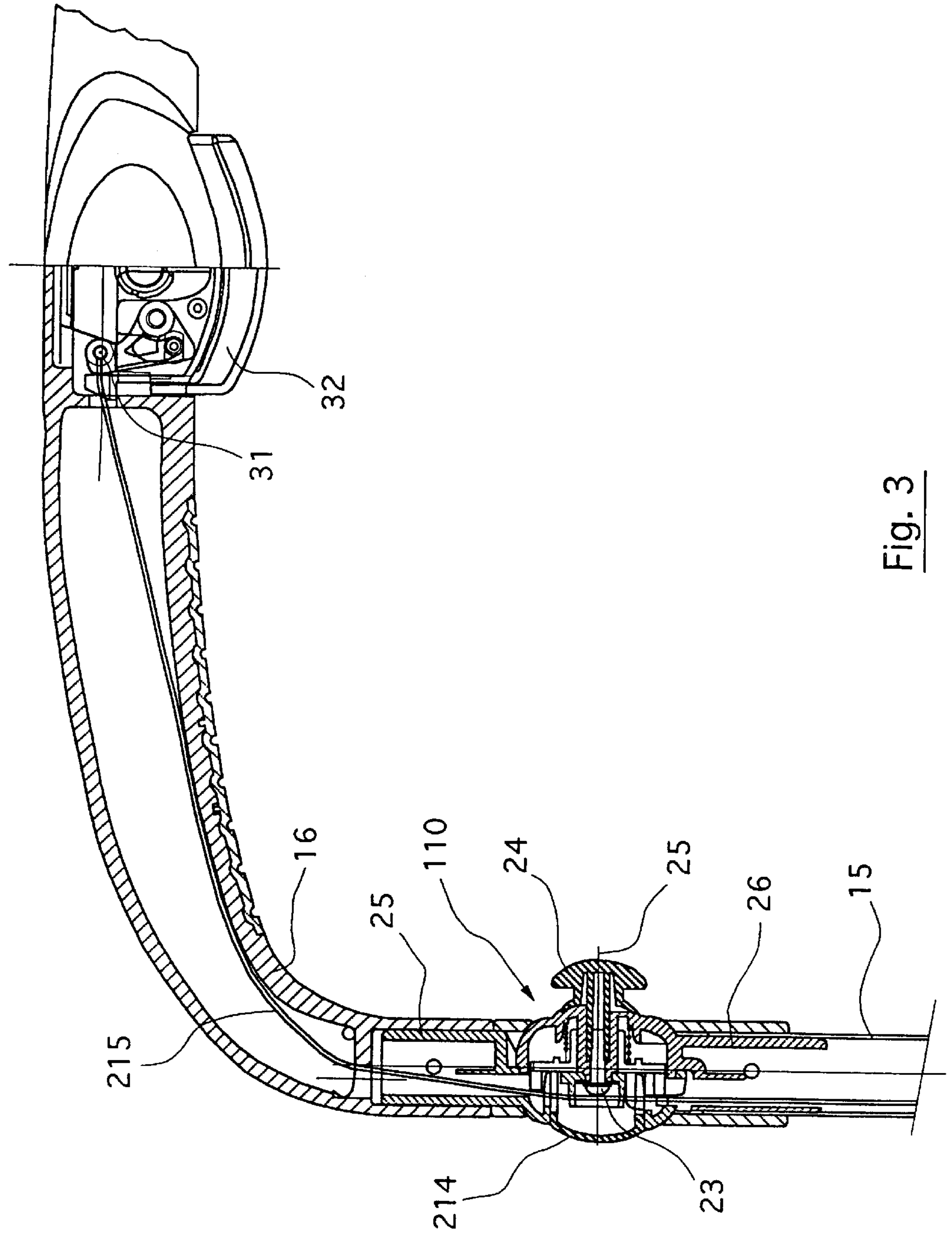
FIG. 3 shows a section of the hinge element in FIG. 2A, and part of the handle.

The routing of the cable (215) is shown on the sectional view in FIG. 3. One of the ends (31) of the cable is fixed to the control handle (32), the operation of which is described in detail below. The cable (215) is guided inside the handle (16), then the hinge element (110) towards the inside edge of the push arm (15), or in other words towards the outside of the pushchair. Thus this opens as much as possible the angles formed by the cable (215) (the angle is never below 90°), and the cable is routed beyond the attachment means (23, 24). In other words, the cable (215) easily passes through the hinge axis (225), since it goes beyond the attachment means (23, 24).

FIG. 3 shows that the openings provided to enable free passage of the cable (215) take account not only of the displacement due to the change to the inclination but also the transverse displacement of some parts, such as the button (214).

Figure 4:
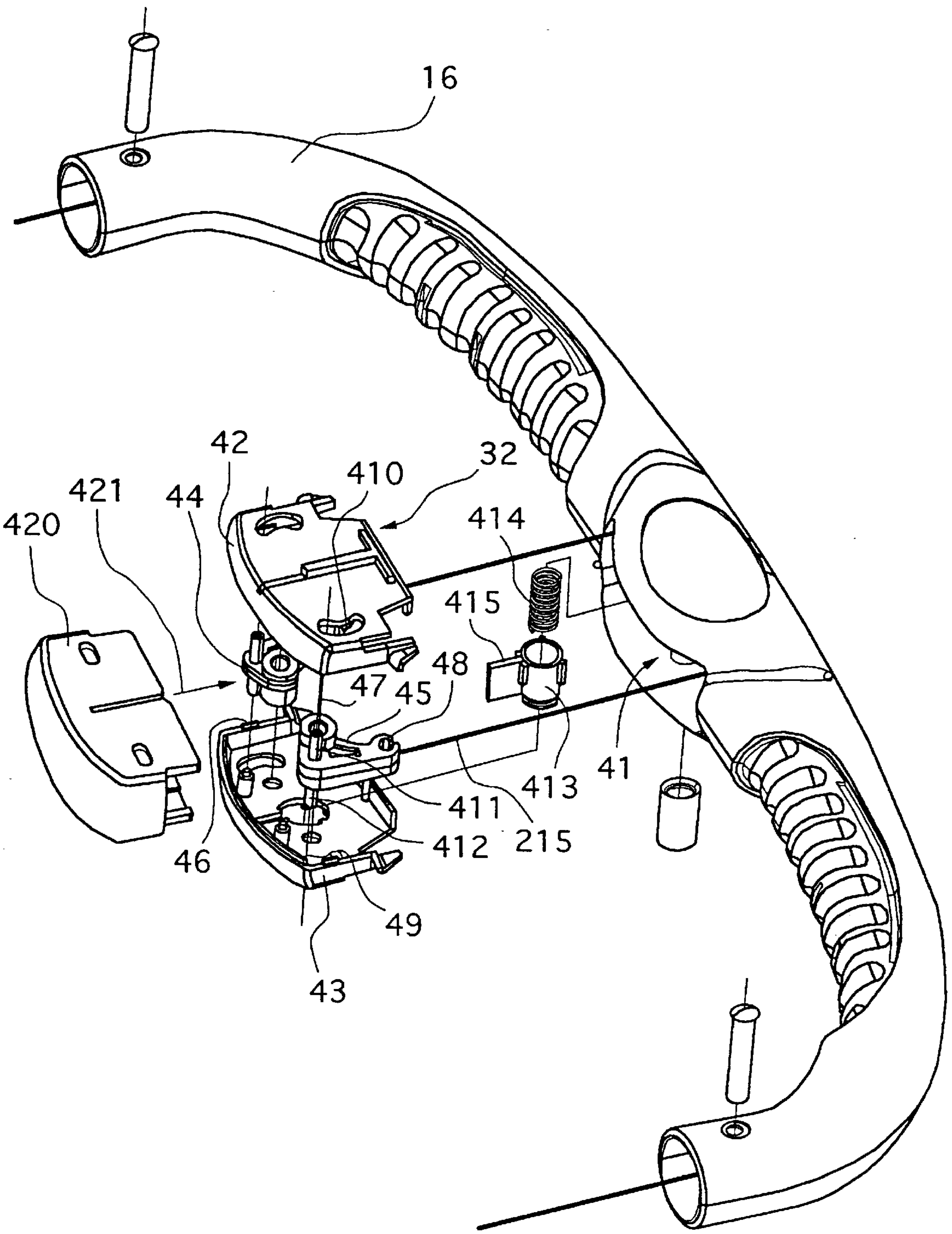
FIG. 4 shows an exploded view of the unlocking control means mounted on the handle of the pushchair in FIG. 1.

FIG. 4 illustrates an advantageous embodiment of the unlocking control button mounted on the handle (16) and the cables (215) attached to it. Other control types are also known, and obviously may be used within the framework of the invention.

This control button comprises a box (32) and is designed to fit into a housing (41) provided for it in the handle (16). It is formed of two half-boxes (42 and 43). A control handle (420) covers the box (32) and can be moved with respect to this box along direction (421).

The mechanism comprises two rods (44 and 45) assembled free to rotate about pins (46 and 47). One end of these rods (48) holds the end of cable (215) in position. The movement of these rods is defined by oblong holes (49, 410) formed in the two half-boxes (42 and 43) and which cooperate with pins (411, 412) formed on the rods.

Thus, when action is taken on box (32), the rods will be guided by the oblong holes and pull on cables (215) which has the effect of unlocking.

A safety device is provided which prevents accidental operation of the control. It consists of a safety button (413) placed inside the box (32) and accessible under the handle (16). In the normal position, the safety button (413) is held in place by the spring (414) such that the projection (415) of the safety button (413) stops in contact with the walls of the handle (420), preventing it from penetrating inside the housing (41).

On the other hand, when the user applies a sufficient force on the safety button (413), the projection (415) is released such that the handle (420) can move. The spring (414) enables this button (413) to return automatically to the safety position.

Note that the fact that two different pins (46 and 47) are used for the rods rather than a central pin, means that this type of safety means (413) can be simply and efficiently fitted inside the control (32).

The unlocking cables (215) can act on very many types of locking means, depending particularly on folding means used. According to the one advantageous embodiment, the locking means comprise a pin that cooperates with a reception element formed on the support arm or on a part fixed to the support arm. Activating the cable then controls retraction of the pin inside the push arm.

Figure 5:
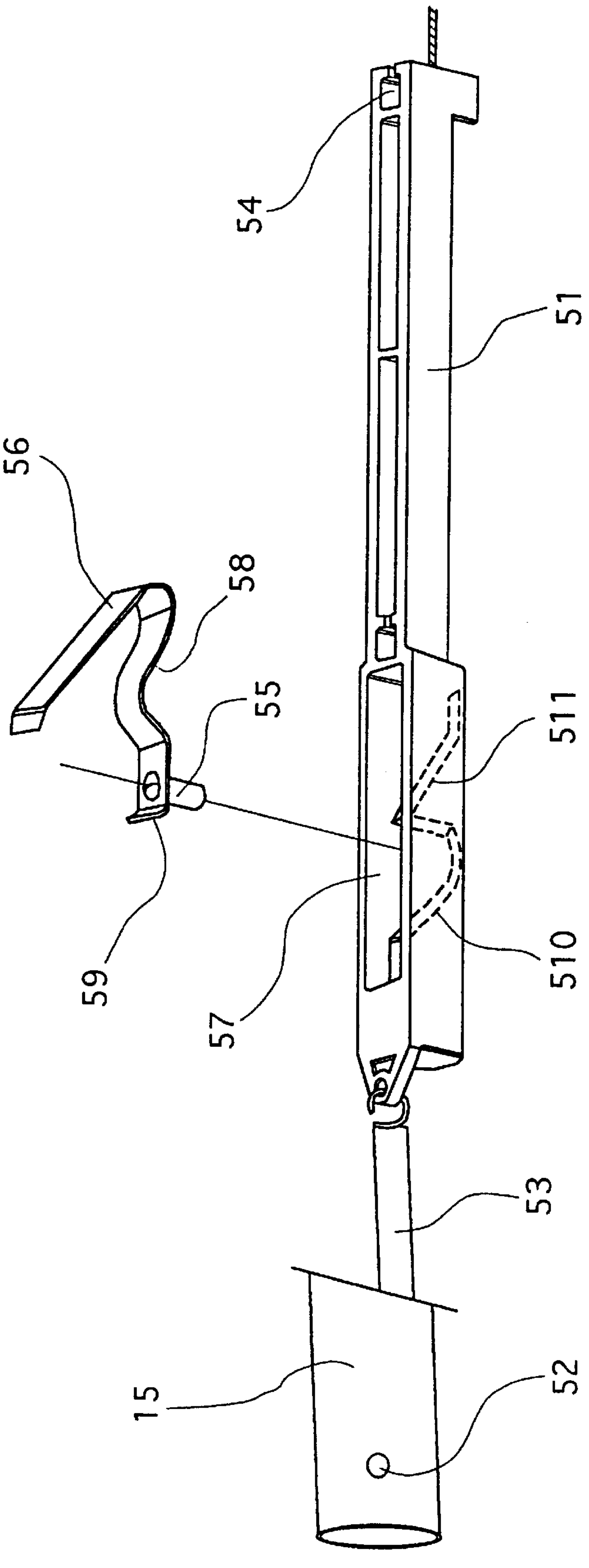
FIG. 5 also illustrates an exploded view of the locking and unlocking means of the pushchair in FIG. 1, activated by the control in FIG. 4.

One embodiment of this type of locking system is shown on FIG. 5. Obviously, the invention may be used with other types of locking systems.

In the system in FIG. 5, a part (51) is provided, for example made of plastic, inside the push arm, and one of the ends of this part is fixed to the lower end of the push arm by a through rivet (52) by means of a return means (53).

The second end (54) of the cable (215) is fixed to the other end of the part (51).

The locking pin (55) is mounted on a blade (56) folded back to form a spring inside the push arm. Under the effect of the corresponding return force, the pin (55) is pushed toads the outside of part (51) and the push arm (15), in order to lock it with the connecting element 111 through openings provided for this purpose. The blade (56) is placed inside a housing (57) which positions it correctly and guides it during unlocking.

When cable (215) is pulled, part (51) is moved upwards (to resist the force applied by the return means (53)). The blade (56) inside the housing (57) cannot follow the movement applied to the part (51), since the pin (55) fixes it to the push arm (15). The two contact surfaces (58) and (59) cooperate with the two inclined guide planes (510 and 511) formed inside the housing (57).

Pin (55) retracts inside the housing (57) in following the displacement dictated by these inclined planes (510 and 511) under the effect of the tension in the cable (215), thus enabling folding.

This configuration with a double inclined plane on each side of the pin enables precise and efficient displacement, the pin remaining perpendicular (or nearly perpendicular) to the push arm at all times.

What is claimed is:

1. A folding pushchair comprising:

a frame that includes two front support arms, two rear support arms, and two push arms extending approximately parallel to the front support arms and being moveable relative to the front support arms between an unfolded position and a folded position;

a guide handle connected to the push arms by two hinge elements that permit a position of the guide handle relative to the push arms to be adjusted;

first and second cables, each cable extending from a first end inside each push arm, through the respective hinge element, and to a second end within the guide handle;

a frame locking mechanism disposed within each push arm and connected to the first end, of each cable;

an unlocking mechanism associated with the guide handle and connected to the second end of each cable; and for each cable, a distance between the first end and the second end is constant regardless of the position of the guide handle relative to the push arm.

2. The folding pushchair according to claim 1, wherein each of the cables intersects a pivot axis of the respective hinge element, regardless of the position of the guide handle.

3. The folding pushchair according to claim 2, wherein each of the hinge elements comprises a first part fixed to the guide handle and a second part fixed to the respective push arm, and a control button installed along the pivot axis and which is moveable along the pivot axis between two positions:

a first position in which the first and second parts of the hinge element are fixed to each other, and a second position in which the first and second parts of the hinge element are free to move with respect to each other so that the position of the guide handle relative to the push arms can be modified;

two openings being formed in the control button, the cable passing through the two openings such that the cable intersects the pivot axis, regardless of the position of the control button.

4. The folding pushchair according to claim 1, wherein each of the cables is guided inside each push arm towards an outside of the pushchair.

5. The folding pushchair according to claim 1, wherein the unlocking mechanism comprises a control handle acting on two symmetrical connecting rods, the connecting rods being connected to the second ends of the cables.

6. The folding pushchair according to claim 5, further including a pivot pin connected to each rod, whereby the connecting rods are pivotable about the pivot pins.

7. The folding pushchair according to claim 6, further including a pin fixed to each connecting rod, each said pin passing through an opening in the unlocking mechanism for limiting pivoting movements of the connecting rods.

8. The folding pushchair according to claim 1, wherein each frame locking mechanism comprises a locking pin that cooperates with a corresponding notch formed in a respective connecting element, and each locking pin is constructed such that it is retractable inside the respective push arm to enable each push arm to move parallel to the front support arms.

9. The folding pushchair according to claim 8, wherein each locking pin is connected to a blade that is housed in a housing formed in a part that is disposed inside the push arm and slidable relative thereto, the part having first and second ends, and the first end of the part is fixed to the respective push arm through return means, and the second end of the part is connected to the fist end of the respective cable, and the housing is shaped such that;

in a first position thereof, the pin cooperates with the corresponding notch; and when the respective cable is pulled, the blade is actuated to remove the pin from the corresponding notch.

10. The folding pushchair according to claim 9, wherein the housing has two inclined guide planes cooperating with two corresponding contact surfaces defined on the blade on each side of the pin.

11. The folding pushchair according to claim 9, wherein the blade comprises a spring element that compresses when a force is applied thereto thereby removing the pin from the corresponding notch, and restores its shape upon removal of the force so that the pin cooperates with the corresponding notch.

* * * * *

UNITED STATES PATENT AND TRADEMARK OFFICE
CERTIFICATE OF CORRECTION

PATENT NO. : 6,565,111 B2 Page 1 of 1
DATED : May 20, 2003
INVENTOR(S) : Ageneau It is certified that error appears in the above-identified patent and that said Letters Patent is hereby corrected as shown below:

Title page,
Item [30], Foreign Application Priority Data, "Sep. 23, 1999" should read -- Sep. 23, 1998 --

Signed and Sealed this

Sixth Day of January, 2004

JAMES E. ROGAN
*Director of the United States Patent and Trademark Office*